US011758021B2

(12) United States Patent
Crocker

(10) Patent No.: US 11,758,021 B2
(45) Date of Patent: *Sep. 12, 2023

(54) SYSTEM FOR PROCESSING COHERENT DATA

(71) Applicant: New Relic, Inc., San Francisco, CA (US)

(72) Inventor: Ronald T. Crocker, Fairview, OR (US)

(73) Assignee: New Relic, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,918

(22) Filed: Sep. 3, 2021

(65) Prior Publication Data
US 2021/0400122 A1 Dec. 23, 2021

Related U.S. Application Data

(63) Continuation of application No. 15/844,345, filed on Dec. 15, 2017, now Pat. No. 11,140,242.

(51) Int. Cl.
H04L 67/75 (2022.01)
H04L 43/08 (2022.01)
(Continued)

(52) U.S. Cl.
CPC ............ H04L 67/75 (2022.05); H04L 43/045 (2013.01); H04L 43/08 (2013.01); H04L 67/02 (2013.01); H04L 67/51 (2022.05)

(58) Field of Classification Search
CPC ....... H04L 67/75; H04L 67/51; H04L 43/045; H04L 43/08; H04L 67/02
See application file for complete search history.

(56) References Cited

U.S. PATENT DOCUMENTS 6,097,399 A * 8/2000 Bhatt ................. G09G 1/162
358/538
7,225,103 B2 * 5/2007 Beresniewicz .... G05B 23/0235
702/179
(Continued)

FOREIGN PATENT DOCUMENTS

DE  112015003888 T5  5/2017
JP  2006190109 A     7/2006
JP  2015089014 A     5/2015

OTHER PUBLICATIONS

The Japan Patent Office, Official Notice of Rejection, Japanese Patent Application No. 2020-532889, dated Oct. 26, 2021, four pages.
(Continued)

Primary Examiner — Glenton B Burgess
Assistant Examiner — Jihad K Boustany
(74) Attorney, Agent, or Firm — Fenwick & West LLP

(57) ABSTRACT

A monitoring system presents metrics or event data by monitoring state information of a computing system. In an embodiment, the monitoring system includes one or more processors that receive state information from an agent executing on the computing system. The state information describes a component of the computing system. In response to receiving the state information, the monitoring system generates aggregate state information based on the state information and prior state information previously received from the agent. The state information and prior state information may correspond to the same time period. The monitoring system generates subscribed state information from the aggregate state information. The subscribed state information is a subset of the aggregate state information selected using instructions of a client. The monitoring system sends
(Continued)

the subscribed state information to the client to cause an update in a user interface presented by the client.

15 Claims, 6 Drawing Sheets

(51) Int. Cl.
*H04L 43/045* (2022.01)
*H04L 67/51* (2022.01)
*H04L 67/02* (2022.01)

(56) References Cited

U.S. PATENT DOCUMENTS

| | | | |
|---|---|---|---|
| 7,617,314 B1 | 11/2009 | Bansod et al. | |
| 8,806,361 B1 | 8/2014 | Noel et al. | |
| 9,225,608 B1* | 12/2015 | Gabrielson | H04L 41/0816 |
| 11,140,242 B2* | 10/2021 | Crocker | H04L 67/51 |
| 2005/0183143 A1 | 8/2005 | Anderholm et al. | |
| 2007/0150581 A1* | 6/2007 | Banerjee | H04L 41/22 |
| | | | 709/224 |
| 2010/0077077 A1 | 3/2010 | Devitt | |
| 2013/0024664 A1 | 1/2013 | Ramanujam | |
| 2013/0159512 A1 | 6/2013 | Groves et al. | |
| 2014/0052624 A1 | 2/2014 | Bansal et al. | |
| 2014/0143294 A1 | 5/2014 | Vitaly | |
| 2014/0143406 A1 | 5/2014 | Malhotra et al. | |
| 2014/0237049 A1 | 8/2014 | Nord et al. | |
| 2015/0295778 A1* | 10/2015 | Hsiao | H04L 41/22 |
| | | | 715/736 |
| 2016/0004820 A1* | 1/2016 | Moore | G16H 15/00 |
| | | | 705/3 |
| 2016/0103757 A1 | 4/2016 | Liu et al. | |
| 2016/0196198 A1 | 7/2016 | Ajith Kumar et al. | |
| 2016/0224676 A1 | 8/2016 | Miller et al. | |
| 2018/0089328 A1* | 3/2018 | Bath | G06F 3/0481 |
| 2018/0091413 A1* | 3/2018 | Richards | H04L 43/14 |

OTHER PUBLICATIONS

PCT International Search Report and Written Opinion, PCT Application No. PCT/IB2018/059018, dated Mar. 4, 2019, 11 pages.
United States Office Action, U.S. Appl. No. 15/844,345, dated May 9, 2019, 22 pages.
United States Office Action, U.S. Appl. No. 15/844,345, dated Oct. 24, 2019, 24 pages.
United States Office Action, U.S. Appl. No. 15/844,345, dated Apr. 7, 2020, 22 pages.
United States Office Action, U.S. Appl. No. 15/844,345, dated Jul. 29, 2020, 27 pages.
United States Office Action, U.S. Appl. No. 15/844,345, dated Feb. 9, 2021, 25 pages.
German Patent and Trade Mark Office, Office Action, German Patent Application No. 11 2018 006 363.1, dated May 18, 2022, nine pages, (with concise explanation of relevance).

* cited by examiner

SYSTEM FOR PROCESSING COHERENT DATA

RELATED APPLICATIONS

This application is a continuation of U.S. patent application Ser. No. 15/844,345 filed on Dec. 15, 2017, which is hereby incorporated by reference herein.

BACKGROUND

This disclosure generally relates to processing data from applications executing on computing systems and generating user interfaces.

Web-based and mobile applications are common tools for delivering content and services to user computing devices. These applications are executed by application systems, which provide content to the computing devices and respond to requests from the computing devices. To provide information describing functionality of an application system, the application system may execute a program such as an agent to monitor the application or application servers. An application system may serve a large number of the user computing devices, resulting in the creation of a large volume of information.

SUMMARY

A monitoring system updates a user interface by monitoring state information of a computing system. In some embodiments, the monitoring system includes one or more processors (e.g., of a server) that receives state information from an agent executing on the computing system. The state information corresponds to a first time period regarding a component of the computing system. In response to receiving the state information, the monitoring system generates aggregate state information based on the state information and prior state information previously received from the agent. The monitoring system may perform a determination that the prior state information also corresponds to the first time period regarding the component, and perform the aggregation for state information associated with the same time period. For example, the state information and prior state information may be generated within the first time period, may pertain to the computing system within the first time period, or may otherwise be associated with the first time period. The monitoring system generates subscribed state information from the aggregate state information. The subscribed state information is a subset of the aggregate state information selected using instructions of a client. The instructions may include a request by the client to subscribe for reporting for a particular metric or event data of the computing system. The monitoring system sends the subscribed state information to the client to cause an update in a user interface presented by the client. The subscribed state information may be sent based on the monitoring system receiving the (e.g., latest) instance of state information. Here, the subscribed state information is a partial aggregation of state information for the time period, and additional state information for the time period may result in another aggregation and transmission of subscribed state information for the time period. The monitoring system may also transmit fully aggregated state information for the time period at lapse of the time period. Subsequent instances of state information may be associated with a subsequent time period, and a similar aggregation and transmission may be performed for multiple time periods.

In various embodiments, the monitoring system can provide the aggregate data for presentation on a client, e.g., in a user interface displaying logically or aesthetically ordered data. The monitoring system can also update the metrics or event data at a later time as additional state information is received. In addition, the monitoring system may detect and ignore state data points from state information.

In some embodiments, the one or more processors of the monitoring system associates the state information with the first time period using a start time and an end time of the state information. The monitoring system retrieves the prior state information responsive to determining that the prior state information was previously received for the first time period. Additionally, the monitoring system may determine a display time associated with the aggregate state information based on the first time period for the state information. The monitoring system sends the display time to the client to cause the update in the user interface to include display of the subscribed state information in connection with the associated display time. In some embodiments, the update in the user interface includes display of an aggregate metric or aggregate event data associated with the computing system in connection with the associated display time.

In some embodiments, the one or more processors of the monitoring system receive a first request from the client to receive the subscribed state information. In response to the first request, the monitoring system generates a subscription associated with the client for providing the subscribed state information to the client. Further, the monitoring system receives a second request from a second client to receive the subscribed state information. In response to the second request, the monitoring system determines whether the subscription associated with the client is active. In response to determining that the subscription associated with the client is active, the monitoring system associates the subscription with the second client. The monitoring system receives a third request from the client to cancel the subscription. In response to the third request, the monitoring system cancels the subscription from the client, and the monitoring system maintains the subscription to provide the subscribed state information to the second client.

Some embodiments may include a method for monitoring state information of a computing system. The method includes receiving state information from an agent executing on the computing system. The state information corresponds to a first time period regarding a component of the computing system. In response to receiving the state information, the method includes generating aggregate state information based on the state information and prior state information previously received from the agent. The prior state information corresponds to the first time period regarding the component. The method further includes generating subscribed state information from the aggregate state information. The subscribed state information is a subset of the aggregate state information selected using instructions of a client. The method further includes sending the subscribed state information to the client to cause an update in a user interface presented by the client.

Some embodiments include a non-transitory computer readable medium storing instructions that when executed by a processor configures the processor to execute the methods for monitoring state information of a computing system as discussed herein.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
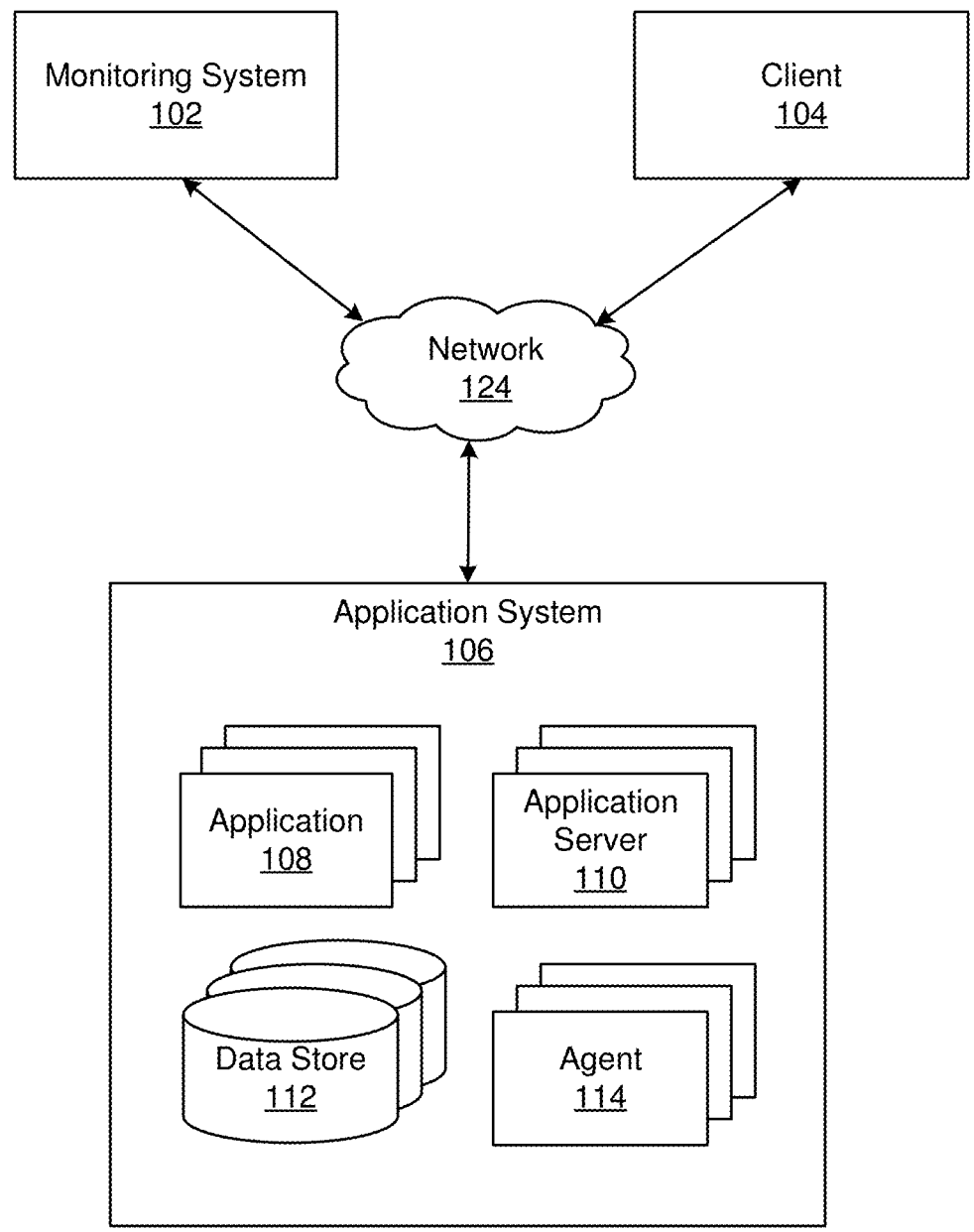
FIG. 1 is a block diagram of a system environment including a monitoring system, in accordance with some embodiments.

FIG. 1 is a block diagram of a system environment, in accordance with some embodiments. The system environment includes a monitoring system 102, an application system 106, and a client 104 (e.g., a client device) that communicate over a network 124, which may include the Internet. The monitoring system 102 monitors the performance of applications 108 executed by one or more application servers 110 of the application system 106. Further, the monitoring system 102 generates user interfaces, such as graphical user interfaces, using state information from the applications systems 106 for presentation on the client 104.

The application system 106 includes one or more application servers 110 and one or more data stores 112. The data store 112 stores application data for the applications 108 executed by the one or more application servers 110. The application server 110 further executes one or more agents 114 that monitor performance of the application system 106, such as processes running on an application server 110, response time of an application 108, transactions in an application 108, processes of transactions in an application 108, the effect of backend processes on performance of an application 108 at clients 104, statistics of a virtual machine running an application 108, other information, or a combination thereof. The agent 114 collects and stores state information relevant to performance of the application 108 or other components of the application system 106. Moreover, the agent 114 may periodically send state information, or other types of information, to the monitoring system 102.

The application 108 may be any of a variety of types of mobile applications or web applications, and may represent a subset of operations of a client-server application. For example, the application 108 operated by the application server 110 may include any server-side processes of a client-server application, such as retrieving and storing database content, generating user interfaces for rendering at the client 104, performing functions requested at the client 104, and communicating content to the client 104 (e.g., over the network 124). The application server 110 may comprise one or more computing devices executing the functions of the application 108.

In some embodiments, the application server 110 includes a computing device executing a Java virtual machine that executes processes of the application 108. The virtual machine provides an environment for running the application 108, and manages objects created by the application 108 and a portion of data store 112 (e.g., a memory) used by the application 108. In particular, the virtual machine allocates memory by moving objects, including variables or data structures created during execution of the application 108 and agent 114, between pools of memory to efficiently manage the available memory of the application system 106. The virtual machine also executes garbage collection processes to identify and remove objects no longer used or referenced in the application 108 to free up the memory occupied by the unused objects for storing other objects.

To monitor the application server 110, the monitoring system 102 can provide the agent 114 to the application server 110 (e.g., as a software development kit or as a module integrated into the software of the application 108). While the application server 110 executes the agent 114, the monitoring system 102 communicates with the agent 114 to monitor performance of the application server 110. The monitoring system 102 receives state information of the application 108 from the agent 114. Additionally, the monitoring system 102 generates informational displays (e.g., user interfaces) for analysis, for example, by an administrator of the application server 110, enabling the administrator to address any performance issues in the application 108. For example, the monitoring system 102 generates tables, charts, or plots indicating metrics or event data for processes of the application 108. The informational displays may include statistics from the monitoring system 102 and/or virtual machine running the application 108.

Figure 2:
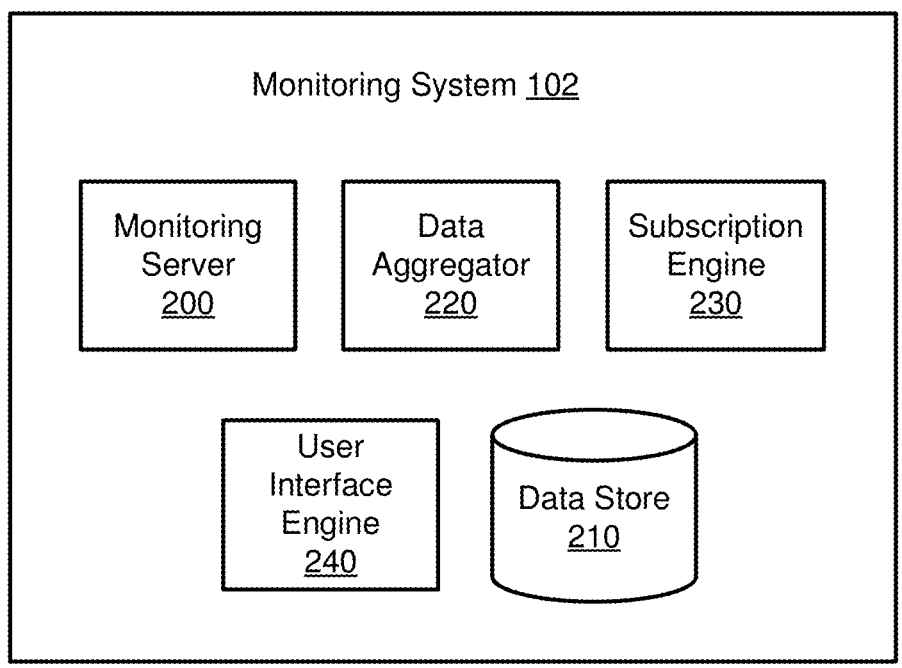
FIG. 2 is a block diagram of a monitoring system, in accordance with some embodiments.

FIG. 2 is a block diagram of a monitoring system 102, in accordance with some embodiments. The monitoring system 102 includes one or more monitoring servers 200, a data store 210, a data aggregator 220, a subscription engine 230, and a user interface engine 240. In other embodiments, the monitoring system 102 may include different or additional components. The monitoring server 200 is a computing device including one or more processors that monitor performance of an application system 106 via communication with the corresponding agent 114, as shown in FIG. 1. The monitoring server 200 may be hosted by an application monitoring service provider, and may monitor performance of any number of application systems 106, including applications 108 and application servers 110 across different application systems 106. The data store 210, data aggregator 220, subscription engine 230, and user interface engine 240 are further described below with reference to the following figures.

Figure 3:
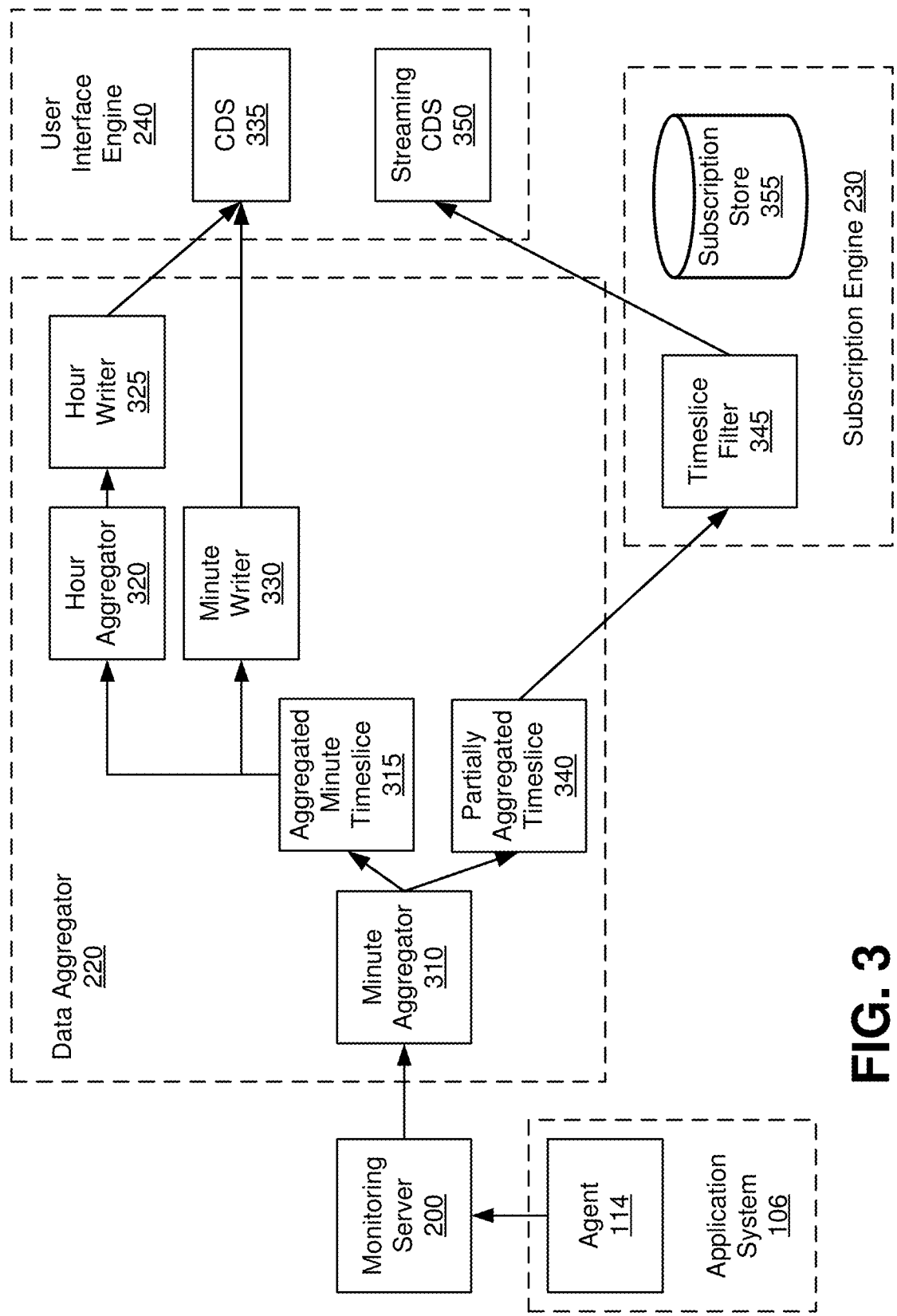
FIG. 3 is a data flow diagram of the monitoring system shown in FIG. 2, in accordance with some embodiments.

FIG. 3 is a data flow diagram of the monitoring system 102 shown in FIG. 2, in accordance with some embodiments. The monitoring server 200 receives state information from the agent 114 of an application system 106. The state information may include metrics or event data describing a component of the application system 106. For example, the metrics may indicate component performance (e.g., network latency, bandwidth, throughput, etc.), usage of computing resources (e.g., CPU, memory, cache, etc.), or hardware states. The event data may indicate, for example, web transactions, web page interactions (e.g., views, clicks, input of data, request for data, etc.), application programming interface (API) calls, file downloads or uploads, or other data associated with applications states.

Each instance of the metrics or event data may be associated with a time period. In some embodiments, the state information is associated with a start time and an end time. The start time and end time indicate timestamps when measurement or capture of a metric or event data began and ended, respectively, for a certain component of the application system 106. For example, measurement of CPU usage (e.g., a metric) of a processor or a count of page views of a website (e.g., event data) over a duration of several minutes or hours. Additionally, state information may be associated with a timestamp (e.g., receipt time) indicating when the monitoring server 200 received the state information from the agent 114. In some embodiments, an event data (or metric) has one timestamp, which indicates the associated event time. The event time may refer to the start time, end time, or some other time between the start and end times. Additionally, the one timestamp (e.g., event time) may be used as both the start time and the end time.

The data aggregator 220 processes state information received by the monitoring server 200. In the embodiment shown in FIG. 3, the data aggregator 220 includes a minute aggregator 310, hour aggregator 320, hour writer 325, and minute writer 330, though in other embodiments, the data aggregator 220 may include aggregators and writers for other durations of time such as a certain number of seconds, days, weeks, months, or any combination thereof. The data aggregator 220 may process metrics or event data. In some embodiments, the data aggregator 220 includes a metric data aggregator and an event data aggregator. The monitoring server 200 may route metrics to the metric data aggregator and route event data to the event data aggregator.

The minute aggregator 310 aggregates state information captured per minute to generate an aggregate minute timeslice 315. Each aggregate minute timeslice 315 may include one or more different instances of state information associated with a time period. In this example, the time period is one minute, although other time periods may be used. The aggregate minute timeslice 315 may include one or more types of aggregated metrics, or one or more types of aggregated event data.

The minute aggregator 310 further generates a partially aggregated timeslice 340. The partially aggregated timeslice 340 includes state information that the minute aggregator 310 has received from the start time of a time period to the current time, where the current time is prior to lapse of the time period. For instance, the agent 114 may send the state information to the monitoring server 200 as the state information is collected. Each instance of state information may represent only a portion of the values of metrics or event data for the time period. However, the partially aggregated timeslice 340 may still be generated and used to provide real-time updates to update a user interface until updated (e.g., final) state information is received for the entire time period.

The hour aggregator 320 and minute writer 330 receive aggregate minute timeslices 315 from the minute aggregator 310. Furthermore, the hour aggregator 320 collects aggregate minute timeslices 315 per hour to generate an aggregate hourly timeslice (not shown in FIG. 3), which is provided to the hour writer 325. A "timeslice," as used herein, refers to a time period for which state information can be aggregated. The hour writer 325 and minute writer 330 provide aggregate hourly timeslices and aggregate minute timeslices 315, respectively, to the chart data service 335 (or CDS 335) of the user interface engine 240. Using the received timeslices of aggregated state information, the user interface engine 240 generates or updates user interfaces for presenting the aggregated state information to users. An example user interface displaying event data is described with reference to FIG. 4. The user interfaces may be updated periodically over time as aggregate minute timeslices 315 or aggregate hourly timeslices are processed by the data aggregator 220. In addition, components of the data aggregator 220 may store timeslices (e.g., including partially aggregated data) and state information in the data store 210.

The minute aggregator 310 further provides partially aggregated timeslices 340 to the timeslice filter 345 of the subscription engine 230. The timeslice filter 345 may filter data from timeslices according to instructions received by the subscription engine 230 or subscriptions retrieved from the subscriptions store 355. The instructions may indicate certain types of metrics or event data to include or exclude for presentation in a user interface. Additionally, the instructions may indicate that the user interface should include state information originating from a particular type of application system 106 or measured (or received) during a particular time period. In some embodiments, the instructions may further define the time period(s) for aggregation. For example, rather than minute and hour aggregations, other longer and shorter time periods may be used. The subscription engine 230 may generate subscriptions and store the subscriptions in the subscriptions store 355 in response to requests (e.g., including instructions) for subscribed state information received from clients 104. In some embodiments, the subscription engine 230 can also filter data from aggregated minute timeslices 315 to generate subscribed state information. The subscribed state information refers to a subset of the partially aggregated timeslice 340 that pertains to a selected metric or event data.

The timeslice filter 345 provides the filtered timeslices to the streaming CDS 350 for updating user interfaces streamed in real time. In particular, the streaming CDS 350 may push state information to streamed user interfaces using partially aggregated timeslices 340 even though state information for the entire time period is unavailable to the monitoring system 102. Accordingly, the streamed user interfaces may include state information that is updated as additional state information is received from agents 114 of application systems 106 being monitored. The subscription engine 230 may also provide state information to the CDS 335. In contrast to the streaming CDS 350 that presents updates within a time period, the CDS 335 presents updates based on aggregation of multiple time periods. In some embodiments, the data aggregator 220 provides aggregate state information at predefined or schedule times to the CDS 335, and provides the subscribed state information to the streaming CDS 350 in response to receiving state information pertaining to the subscription from the agent 114.

Figure 4:
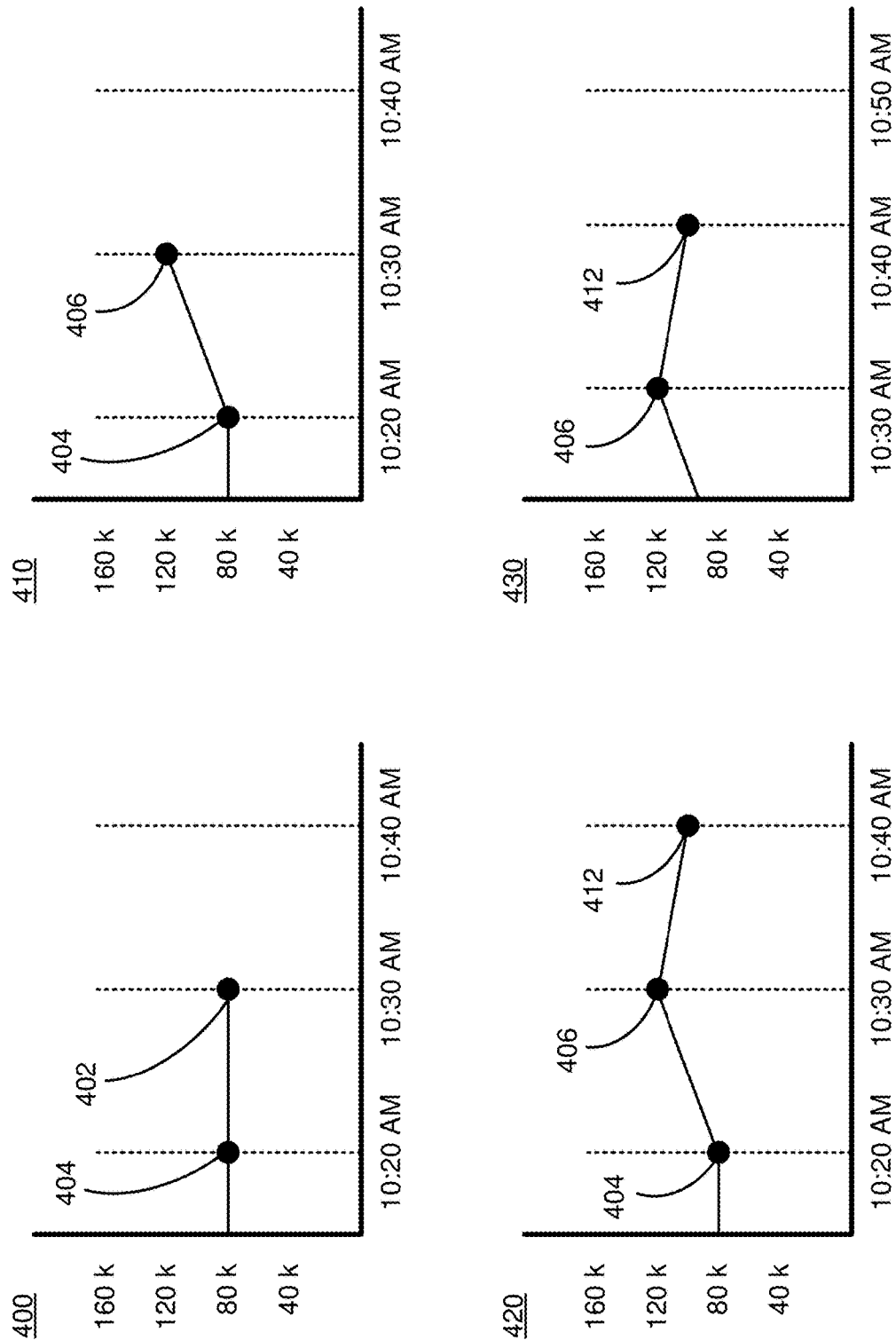
FIG. 4 illustrates examples of user interfaces including state information, in accordance with some embodiments.

FIG. 4 illustrates examples of user interfaces including state information, in accordance with some embodiments. The user interface engine 240 generates or updates the user interfaces 400, 410, 420, and 430 to display a metric or event data of an application system 106. In the examples of FIG. 4, the state information is a metric defining the number of web page views over time. Other types of metrics or event data may also be provided to user interfaces. The user interfaces are described below in conjunction with the methods shown in FIGS. 5-6.

Figure 5:
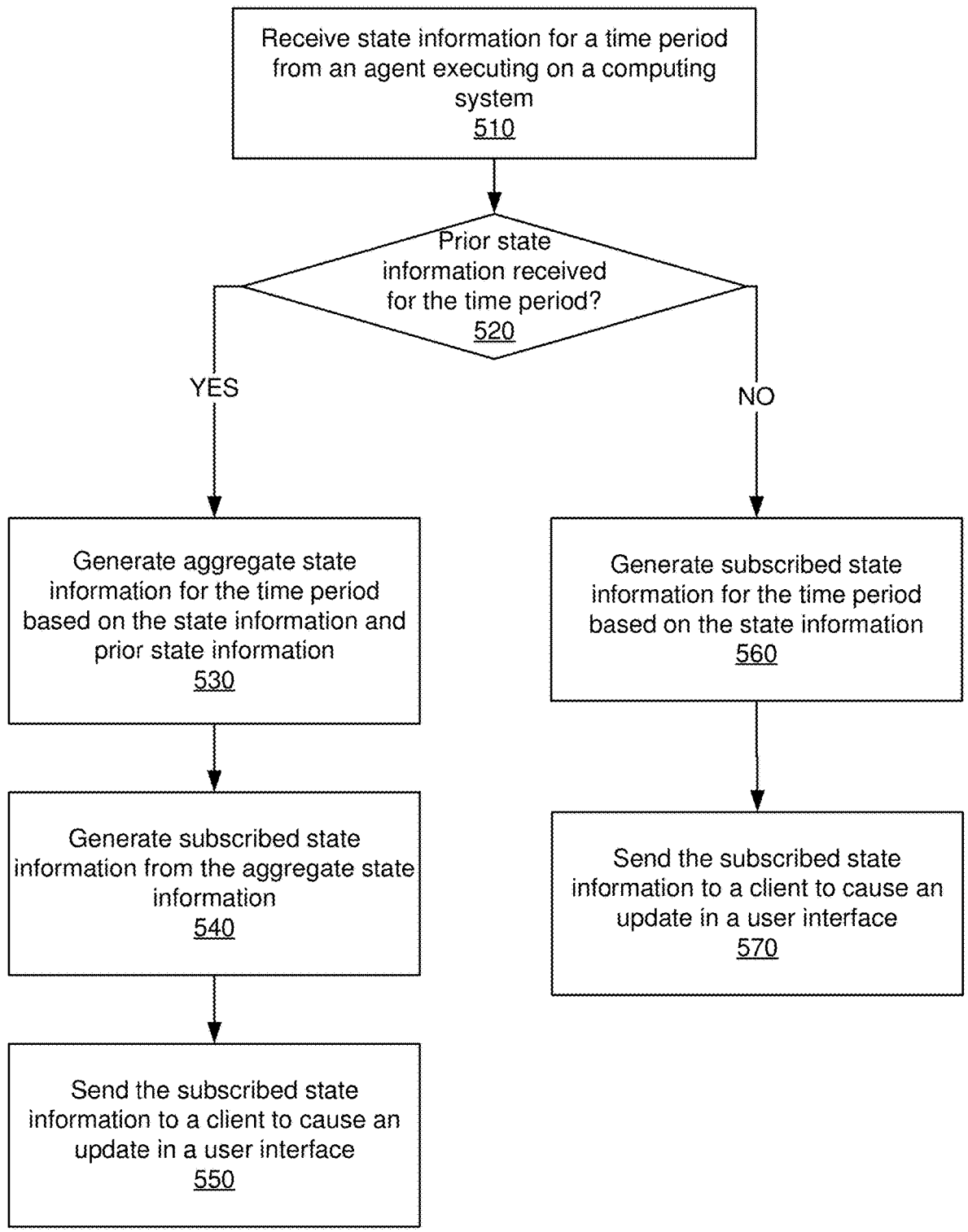
FIG. 5 is a flow chart of a method for updating a user interface using state information, in accordance with some embodiments.

FIG. 5 is a flow chart of a method 500 for updating a user interface using state information, in accordance with some embodiments. The method 500 provides for display of metrics or event data generated using state information from an application system 106. In one embodiment, the method 500 is performed by the system of FIG. 1. Other entities may perform some or all of the steps of the method 500 in other embodiments. Likewise, embodiments may include different and/or additional steps, or perform the steps in different orders.

The monitoring system 102 receives 510 state information from an agent 114 executing on the application system 106

(e.g., also referred to as a computing system). The state information is for a time period regarding a component of the application system 106. In some embodiments, the state information includes a metric or event data associated with the time period. In some embodiments, the state information may be represented by a data structure defining a time period and a metric or event data value corresponding with the time period. In some embodiments, the data structure may further include a receipt time of the state information by the monitoring system 102. In some embodiments, state information may be represented by a data structure {start time, end time, data, receive time} in JavaScript Object Notation (JSON).

The monitoring system 102 (e.g., the data aggregator 220) determines 520 whether prior state information has been received for the time period. The prior state information may also have an associated time period. Responsive to determining that the received state information and the prior state information are for the same time period, the monitoring system 102 may combine the state information and prior state information into aggregate state information. In contrast, responsive to determining that the state information and prior state information are for different time periods (e.g., meaning that the prior time period has lapsed), the monitoring system 102 may determine to not combine the state information and the prior state information into aggregate state information. The prior state information may include one or more instances of received state information that has been previously aggregated for the time period of the prior state information.

In response to determining that the state information was received for the same time period as the prior state information, the monitoring system 102 (e.g., the data aggregator 220) generates 530 aggregate state information based on the state information and the prior state information.

The monitoring system 102 (e.g., subscription engine 230) generates 540 subscribed state information from the aggregate state information. The subscribed state information may be a subset of the aggregate state information selected by the subscription engine 230 using instructions from a client 104. For example, the subscription engine 230 filters the aggregate state information based on the instructions. A user who wants to request certain data from the monitoring system 102 may use the client 104 to input a request to receive the subscribed state information. The client 104 provides instructions corresponding to the user's request to the monitoring system 102. For example, the instructions indicate that the user is interested in aggregate state information for a particular subset of one or more types of metric or event data, or other criteria describing data for presentation on a user interface. In another example, the instructions may specify the time period for state information aggregation and reporting. In some embodiments, the subscription engine 230 filters state information according to the user's instructions, e.g., for a requested or active subscription.

The monitoring system 102 (e.g., subscription engine 230) sends 550 the subscribed state information to the client 104 to cause an update in a user interface presented by the client 104. The creation and sending of the subscribed state information may be triggered when the monitoring system 102 receives the state information (e.g., partial aggregation for the time period), or when a time period has lapsed, which may trigger the monitoring system 102 to report the aggregated subscribed state information for the lapsed time period. The subscribed state information is provided to the client 104 in a coherent manner for presentation within the user interface. Each instance of subscribed state information from the monitoring system 102 may correspond with a data point that can be presented without the client 104 having to access any prior state information for the time period to generate the updated data value for the point. Furthermore, prior to lapse of the time period, the subscribed state information may include partially-aggregated data. Here, the subscribed state information thus represents complete "so-far" values for the time period. The partially aggregated data does not represent a final value for the time period, as it includes only state information that the system has received so far for the time period (e.g., prior to lapse of the time period where a reliable full aggregation can be generated). Nonetheless, the subscribed state information including partially-aggregated data can be presented to the user interface as useful information, and may be updated with further partial aggregates for the time period prior to lapse of the time period.

In some embodiments, the subscribed state information includes a display time and a metric or event data value that corresponds with the time value. The subscribed state information may be represented by a data structure {display time, data}, where the display time can be used as an X axis value within a graph (or chart) of the user interface, and the data can be used as a corresponding Y axis value of the graph. Thus, each instance of subscribed state information may define a point in the graph of the user interface. In some embodiments, the user interface engine 240 determines the display time based on the start time or end time of the latest instance of state information. For example, each time period may be associated with a display time. The user interface engine 240 may use the start and end times of state information to determine the time period, and then to determine the associated display time for the time period. In some embodiments, the user interface engine 240 associates all aggregated or partially aggregated state information within a time period with a display time in the user interface.

As shown in user interface 400 of FIG. 4, the user interface engine 240 plots subscribed state information in a graph as a point 402 (at display time X=10:30 AM) for a time period defined from 10:20 AM to 10:30 AM. Here, the display time is determined from the end time of the time period, although other times within the time period may also be used as the display time, such as the start time or the average time between the start and end time. Furthermore, the time period used for aggregation is 10 minutes, although other time periods may be used. The user interface engine 240 generates the point 402 based on one or more instances of state information associated with the time period between 10:20 AM and 10:30 AM. Where multiple instances of state information for the time period has been aggregated, the 80 k data value of the point 402 represents aggregated instances state information. In another example, the 80 k data value of the point 402 represents a single instance of state information. Here, the state information shown by the point 402 in the user interface 400 may be defined by the data structure {10:21 AM, 10:23 AM, 80 k, 10:23 AM}. The data structure includes event data 80 k indicating a number of page views captured from start time 10:21 AM to end time 10:23 AM, or in the case of partially aggregated state information, from the start time 10:21 to the current or latest time within the time period. In addition to point 402, the user interface 400 includes a point 404, which represents state information associated with a prior time period.

In some embodiments, the display time is selected based on the receipt time, start time, or end time of the latest instance of state information received in the time period. For example, rather than having display times corresponding with the end of the time period as shown in FIG. 4, the display time may be some other time within the period.

As shown in the user interface 410 of FIG. 4, a subsequent instance of state information for the time period between 10:20 AM and 10:30 AM results in the point 402 being updated to the point 406 in the graph. For example, the point 402 may be prior state information associated with the time period when an additional instance of state information associated with the time period is received by the monitoring system 102. The additional state information may be defined by the data structure {10:22 AM, 10:24 AM, 40 k, 10:24 AM}. The data aggregator 220 aggregates data value of 80 k of the point 402 with the data value of 40 k to result in a data value of 120 k for the 10:20 AM to 10:30 AM time period. The monitoring system 102 may send subscribed state information for the point 406 using the data structure {display time, data}, where the display time is 10:30 AM for the time period, and the data value is aggregated to 120 k. The user interface engine 240 plots the subscribed state information as the point 406 (at display time X=10:30 AM) for the time period defined from 10:20 AM to 10:30 AM, replacing the point 402.

Returning to step 520 of FIG. 5, in response to determining that the state information was received for a different time period as prior state information, the monitoring system 102 (e.g., subscription engine 230) generates 560 subscribed state information for the time period based on the state information. Because no prior state information exists for the time period, the state information received at 510 corresponds with a new time period. Rather than aggregating with prior state information, the monitoring system 102 uses the state information to create subscribed state information for another (e.g., subsequent) time period. Furthermore, the state information may be used as prior state information for subsequent state information received for the time period, and may be aggregated with the subsequent state information.

The monitoring system 102 (e.g., subscription engine 230) sends 570 the subscribed state information to the client 104 to cause an update in a user interface presented by the client 104. As shown in the user interface 420 of FIG. 4, the subsequent instance of state information for the time period between 10:30 AM and 10:40 AM results in a new point 412 being added to the graph. The monitoring system 102 may send subscribed state information for the point 412 using the data structure {display time, data}, where the display time is 10:40 AM for the time period, and the data value is 90 k. Here, the state information received at 510 may be defined by a data structure {10:33 AM, 10:34 AM, 90 k, 10:34 AM}.

In some embodiments, the user interface presented by the client 104 shifts the X axis for time values when state information for a new time period is received by the client 104. As shown in the user interface 430 of FIG. 4, the chart is shifted leftwards such that the point 404 for the time period from 10:10 AM to 10:20 AM is removed (or hidden) from the graph. For example, the X axis may shifted when the client 104 receives subscribed state information for a point having a time value that is not on the chart. In some embodiments, if the received state information is for a lapsed time period, then the client 104 may ignore the point as being stale or outdated. In other embodiments, the client 104 may update the data value for a lapsed time period even after subscribed state information for a subsequent time period has been received and plotted by client 104.

The method 500 may be repeated by the monitoring system 102 for additional instances of state information. Each new instance may be handled as discussed in the method 500. For example, new state information for a time period with prior state information may be aggregated with the prior state information. New state information for a time period without prior state information is not aggregated, at least until subsequent state information for the time period is received by the monitoring system 102. The monitoring system 102 generates and sends subscribed state information, and the client 104 updates the user interface accordingly using the subscribed state information.

Figure 6:
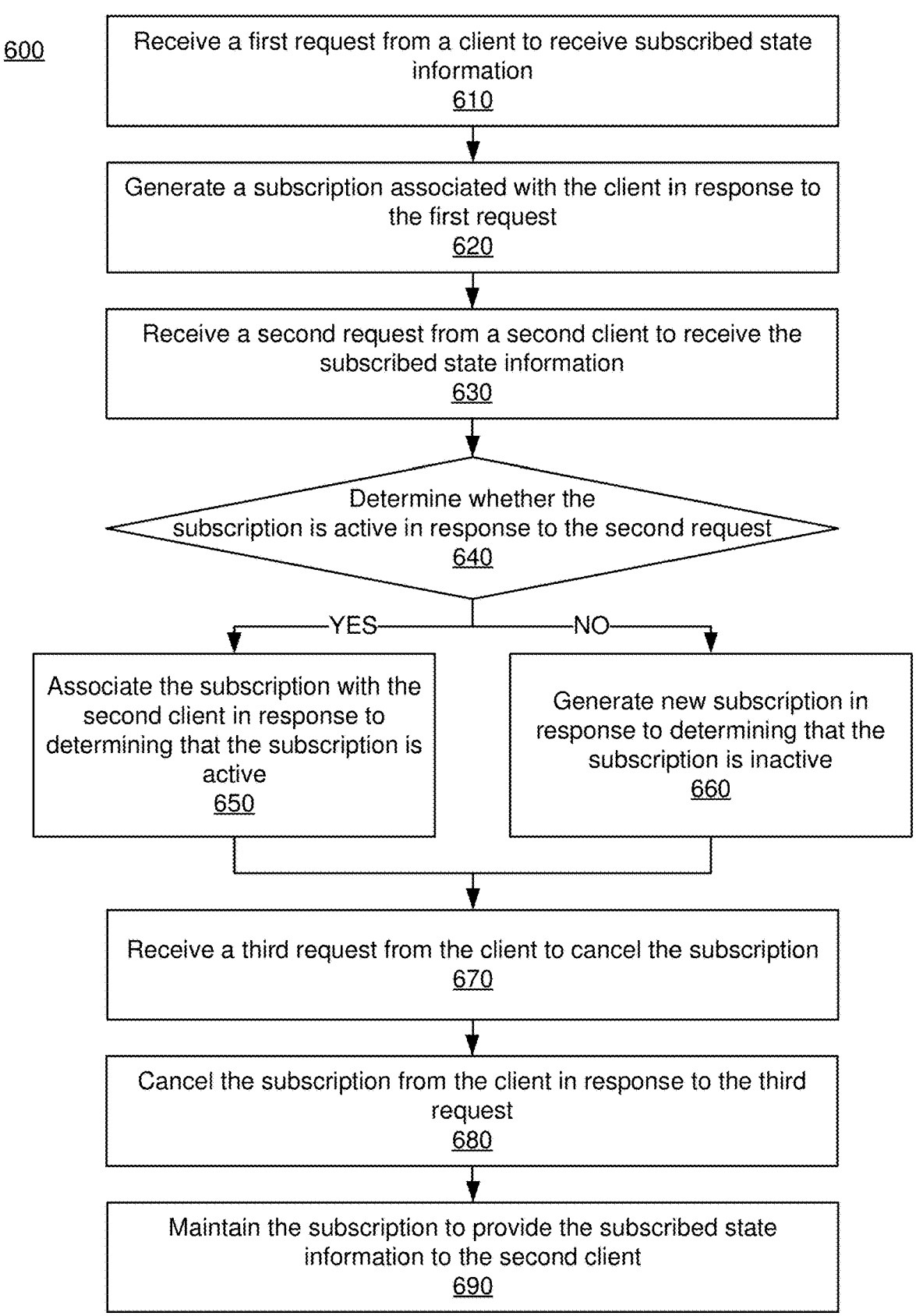
FIG. 6 is a flow chart of a method for maintaining subscriptions by a monitoring system, in accordance with some embodiments.

FIG. 6 is a flow chart of a method 600 for maintaining subscriptions by a monitoring system 102, in accordance with some embodiments. In one embodiment, the method 600 is performed by the system of FIG. 1. Other entities may perform some or all of the steps of the method 600 in other embodiments. Likewise, embodiments may include different and/or additional steps, or perform the steps in different orders.

The monitoring system 102 (e.g., subscription engine 230) receives 610 a first request from a client 104 to receive subscribed state information. The monitoring system 102 (e.g., subscription engine 230) generates 620 a subscription associated with the client 104 in response to the first request. A subscription, as used herein, refers to an association between subscribed state information and the client 104, and is used by the subscription engine 230 to send the subscribed state information to a client device 104. A subscription may specify, for example, a metric or event data of interest. A subscription may also specify a time period for the reporting.

The monitoring system 102 (e.g., subscription engine 230) receives 630 a second request from a second client 104 to receive the subscribed state information. The second client 104 may be different from the first client 104.

The monitoring system 102 (e.g., subscription engine 230) determines 640 whether the subscription is active in response to the second request. For example, the subscription engine 230 may evaluate existing subscriptions to find a subscription that matches the subscription of the second request. If a match is found, then the subscription is determined to be active. If not match is found, then the subscription is determined to be inactive.

In response to determining that the subscription is active, the monitoring system 102 (e.g., subscription engine 230) associates 650 the subscription with the second client 104. This may be advantageous, for example, because instead of generating a new subscription for the second client 104, the subscription engine 230 is opportunistic in that it shares the same subscription for multiple clients 104, e.g., of users requesting common types of metrics or event data. Thus, the subscription engine 230 may reduce the amount of computational or memory resources of the monitoring system 102 required to maintain subscriptions for state information. In some embodiments, each subscription may be handled by a single subscription engine 230 that communicates with one or more client devices 104 to provide subscribed state information in accordance with the subscription.

Returning to 640, in response to determining that the subscription is inactive, the monitoring system 102 (e.g., subscription engine 230) generates 660 a new subscription to associate the subscribed state information to the second client 104. The new subscription may specify the same or different metrics, event data, or time periods of interest as the inactive subscription.

The monitoring system 102 (e.g., subscription engine 230) receives 670 a third request from the client 104 to cancel the subscription. The subscription engine 230 cancels 680 the subscription from the client 104 in response to the third request. In some embodiments, the subscription engine 230 cancels inactive subscriptions. The subscription engine 230 maintains 690 the subscription to provide the subscribed state information to the second client 104. Similarly, if the second client 104 cancels the subscription, the subscription engine 230 may cancel the subscription for the second client 104 and maintain the subscription for the client 104. In some embodiments, the subscription engine 230 keeps subscriptions in the subscription store 355 as long as at least one client 104 is using the subscription, even if other clients 104 cancel their subscription. Over time, different clients 104 may provide requests to subscribe or cancel (unsubscribe) for a particular subscription. Responsive to determining that no more clients 104 are using a subscription, the subscription engine 230 may remove the subscription from the subscription store 355 to free up unused memory storage and processing resources.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system, comprising:
one or more processors; and
a non-transitory computer readable storage medium comprising stored computer program code that, when executed, cause the one or more processors to:
   receive, from a client, subscription information for filtering aggregated state information into a subset of state information from the aggregated state information;
   receive state information regarding a component of a computing system for a first predefined time period comprising a plurality of predefined second time periods, wherein the predefined first and second time periods are defined by the subscription information received from the client; and
   after completion of each predefined second time period of the plurality of predefined second time periods during the first predefined time period:
      aggregate the state information regarding the component for a current predefined second time period with the state information regarding the component for each previously completed predefined second time periods;
      filter the aggregated state information into the subset of state information using filtering instructions in the subscription information;
      associate the subset of state information with the client based on the subscription information;
      send, to the client and using on the association, a performance metric of the component determined from the subset of state information; and
      provide, to the client, at least a portion of the performance metric of the component for display on a user interface of the client, the performance metric displayed over a display time associated with the predefined first time period.

2. The system of claim 1, wherein the one or more processors are configured to aggregate the state information received within the predefined first time period by identifying the state information as belonging to the predefined first time period using a start time and an end time associated with the state information received from the component.

3. The system of claim 1, wherein the one or more processors are further configured to, upon lapse of each predefined second time period within the predefined first time period:
   determine a display time associated with the at least a portion of the aggregated state information based on a time associated with the predefined first time period; and
   send the display time to the client.

4. The system of claim 3, wherein the at least a portion of the aggregated state information includes an aggregate metric.

5. The system of claim 3, wherein the at least a portion of the aggregated state information includes aggregate event data.

6. The system of claim 3, wherein, for each predefined second time period within the predefined first time period, the client updates a user interface to include a display of the at least a portion of the aggregated state information with the display time.

7. A non-transitory computer readable medium comprising stored program code that when executed by one or more processors configure the one or more processors to:
receive, from a client, subscription information for filtering aggregated state information into a subset of state information from the aggregated state information;
receive state information regarding a component of a computing system for a first predefined time period comprising a plurality of predefined second time periods, wherein the predefined first and second time periods are defined by the subscription information received from the client; and
after completion of each predefined second time period of the plurality of predefined second time periods during the first predefined time period:
aggregate the state information regarding the component for a current predefined second time period with the state information regarding the component for each previously completed predefined second time periods;
filter the aggregated state information into the subset of state information using filtering instructions in the subscription information;
associate the subset of aggregate state information with the client based on the subscription information;
send, to the client and using on the association, a performance metric of the component determined from the subset of state information; and
provide, to the client, at least a portion of the performance metric of the component for display on a user interface of the client, the performance metric displayed over a display time associated with the predefined first time period.

8. The computer readable medium of claim 7, wherein the one or more processors are configured to aggregate the state information received within the predefined first time period by identifying the state information as belonging to the predefined first time period using a start time and an end time associated with the state information received from the component.

9. The computer readable medium of claim 7, wherein the program code further configures the one or more processors to, upon lapse of each predefined second time period within the predefined first time period:
determine a display time associated with the at least a portion of the aggregated state information based on a time associated with the predefined first time period; and
send the display time to the client.

10. The computer readable medium of claim 9, wherein the at least a portion of the aggregated state information includes at least one of an aggregate metric or aggregate event data.

11. The computer readable medium of claim 9, wherein, for each predefined second time period within the predefined first time period, the client updates a user interface to include a display of the at least a portion of the aggregated state information with the display time.

12. A method, comprising, by one or more processors:
receiving, from a client, subscription information for filtering aggregated state information into a subset of state information from the aggregated state information;
receiving state information regarding a component of a computing system for a first predefined time period comprising a plurality of predefined second time periods, wherein the predefined first and second time periods are defined by the subscription information received from the client; and
after completion of each predefined second time period of the plurality of predefined second time periods during the first predefined time period:
aggregate the state information regarding the component for a current predefined second time period with the state information regarding the component for each previously completed predefined second time periods;
filter the aggregated state information into the subset of state information using filtering instructions in the subscription information;
associate the subset of state information with the client based on the subscription information;
send, to the client and using on the association, a performance metric of the component determined from the subset of state information; and
provide, to the client, at least a portion of the performance metric of the component for display on a user interface of the client, the performance metric displayed over a display time associated with the predefined first time period.

13. The method of claim 12, further comprising, by the one or more processors, aggregating the state information received within the predefined first time period by identifying the state information as belonging to the predefined first time period using a start time and an end time associated with the state information received from the component.

14. The method of claim 12, further comprising, by the one or more processors and upon lapse of each predefined second time period within the predefined first time period:
determining a display time associated with the at least a portion of the aggregated state information based on a time associated with the predefined first time period; and
sending the display time to the client.

15. The method of claim 14, wherein the at least a portion of the aggregated state information includes at least one of an aggregate metric or aggregate event data.

* * * * *